Oct. 4, 1927.

L. H. CROOK 1,643,945

INFLATING AND INJECTING DEVICE

Filed Sept. 17, 1926   2 Sheets-Sheet 1

Inventor
Louis H. Crook
By Herman Jakobsson
Attorney

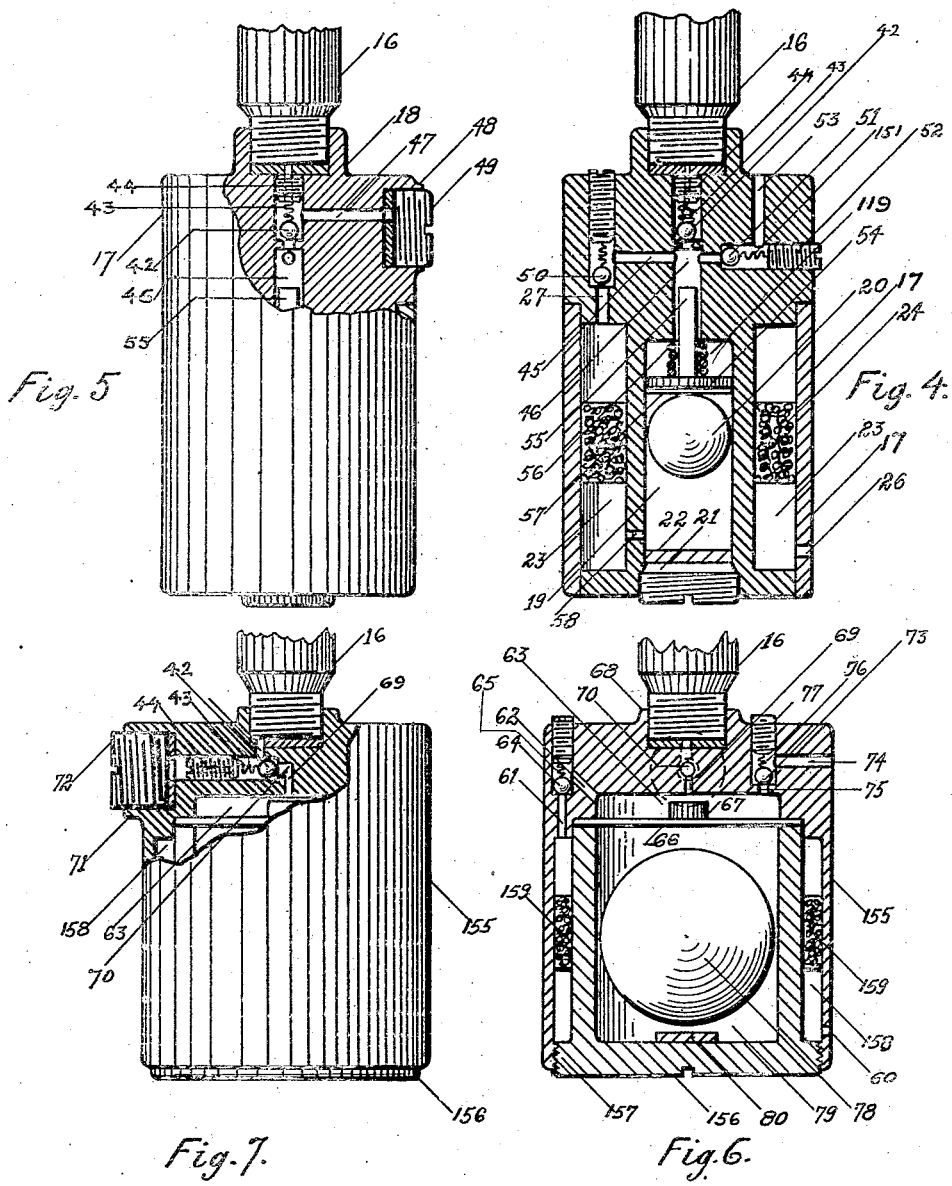

Patented Oct. 4, 1927.

1,643,945

UNITED STATES PATENT OFFICE.

LOUIS H. CROOK, OF WASHINGTON, DISTRICT OF COLUMBIA, ASSIGNOR OF ONE-HALF TO G. HERMAN JAKOBSSON, OF TAKOMA PARK, MARYLAND.

INFLATING AND INJECTING DEVICE.

Application filed September 17, 1926. Serial No. 136,165.

The present invention relates to an injecting or inflating device, the main object of which is to inflate pneumatic tires automatically by means of a movable mass obtaining reciprocating movement from the rotation of a wheel tire to which the device is secured.

Another application of the device is for injection of other fluids or liquids automatically and periodically and always by means of a freely moving mass or a floating piston, actuated by the rotation or reciprocation of a body to which the device is attached. In other words, the device may be used not only in connection with a revolving body, such as a wheel, but also with a reciprocating or an oscillating body, such as a piston or shaft.

The present invention aims at providing a device of this class which may be attached to a pneumatic tire wheel, for instance, without any alteration of the latter whasoever. All that is necessary is to attach the device to the stem of the inflating valve of the tire, replacing the usual cap, in the case of old wheels, or to incorporate the device with the inflating valve on new wheels.

This is made possible by the fact that the device is self contained and entirely independent of any exterior connections as long as it is mounted to receive a revolving or reciprocating movement.

In the accompanying drawings the invention is illustrated as applied to a pneumatic wheel tire.

Fig. 4 is a longitudinal section of the device showing a slightly modified form;

Fig. 5 is a side elevation of Fig. 4, partly in section;

Fig. 6 a longitudinal section of another modification of the device;

Fig. 7 a side elevation, partly in section, of Fig. 6; and

Figure 8:
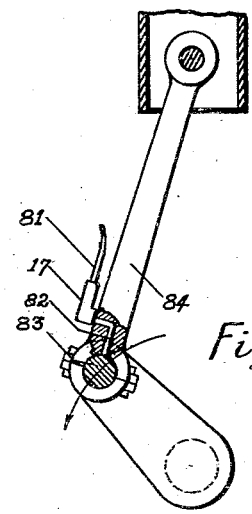

Fig. 8 is a fragmentary elevation of a rod or pitman with the device applied as an automatic lubricating apparatus.

Figure 1:
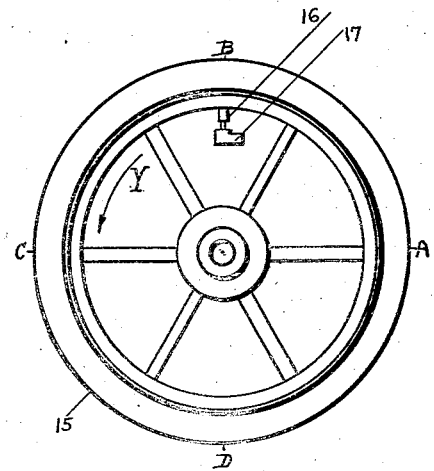
Fig. 1 is a side elevation of a pneumatic tire wheel with the device in place thereon.
Figure 3:
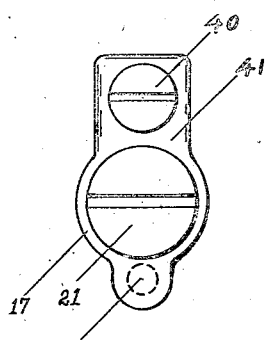
Fig. 3 is an end view of Fig. 2.
Figure 2:
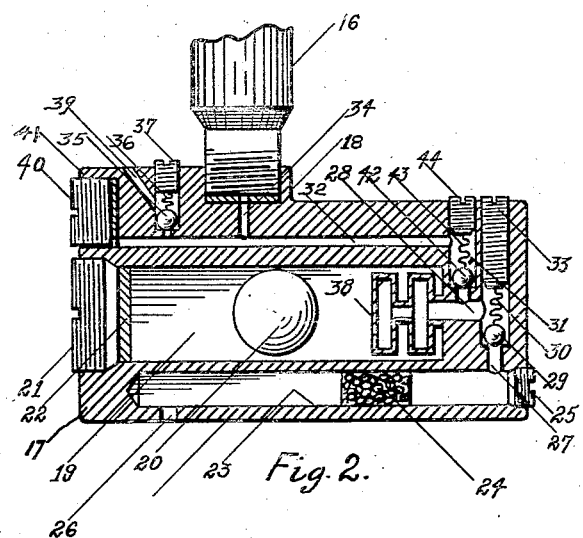
Fig. 2 is a longitudinal section of an embodiment of the invention mounted on a valve stem of the tire.

Referring particularly to Figures 1, 2 and 3, numeral 15 represents a pneumatic wheel tire with the inflating valve stem 16.

To the threaded end of the stem the housing 17 of the inflating device is attached, which for this purpose is provided with a threaded socket 18. The housing has several borings or cavities of which the main one constitutes a chamber 19 for a movable mass or floating piston 20 here represented by a ball, instead of which, however, any other suitably shaped body may be used. The floating piston 20 fits loosely in the chamber 19 which is of sufficient length to permit the ball to move freely from end to end therein. A plug 21 closes the open end of the chamber 19, being threaded or in any other manner secured therein. A washer 22 may be provided at the inner end of the plug to deaden the noise caused by the hammering of the ball.

With its axis parallel to that of the chamber 19 is situated another cavity 23 filled with a suitable filter 24. This cavity is also plugged at one end as at 25 and has a small air vent 26 at its other end and an air passage at the other end communicating with the main chamber 19 thru the branches 27 and 28. A check valve 29 is adapted to close the passage 27 when pressed into its seat by a spring 30, a screw stop 33 being used to adjust the load of the spring.

Still another bore 32 connects with the air passage 27 thru a branch 31, while another branch 34 connects the bore 32 with the inlet opening of the valve stem 16. For the bore 32 is inserted a relief or pressure control valve 35 held in its seat by a spring 36, the load of which may be adjusted by a screw plug 37. Back of the relief valve 35 the bore 32 is provided with an air vent or exhaust 39.

Supposing that the required maximum pressure for the pneumatic tire were 30 pounds per square inch, then the spring 36 is compressed by the plug 37 until it exerts that pressure on the control valve 35. In the chamber 19 and coaxial therewith is inserted an expanding cell or metallic bellows 38 made in the form of a circumferentially corrugated cylinder having a shank fitting in the branch passage 28. In the branch 31 is shown a one way valve 42 held in position by a spring 43 and a plug 44 for preventing back flow into the cell or bellows, thus making the Shrader valve in the valve stem 16 unnecessary.

During operation the movable mass or floating piston 20, actuated by the movement of the wheel or other movable body, either in rotation, translation or a combination of these motions, reciprocates in the chamber 19 between the washer 22 and the cell 38 delivering a blow against the latter thereby compressing the same which in turn compresses the air contained in the cavity 28 and its branches 31, 32, 34 thus forcing air thru the valve stem opening into the tire tube 15. Should now the pressure in the tube be 30 pounds or the highest permissible, no more air will enter the same, but the valve 35 will then open, permitting the air from the cavity 32 to be exhausted thru the vent 39, thus maintaining the maximum permissible pressure in the tire tube.

When the cell again expands, fresh air is drawn into the cavity entering thru the vent 26, passing thru the filter 24, the passage 27 and by the check valve 29. Thus, during every stroke of the floating piston, the air is replenished in the cavities 28, 31, 32.

When the housing 17 is secured to the valve stem 16 by the socket 18, the ball or floating piston 20 reciprocates in the plane of the wheel and tangentially thereto or perpendicularly to the valve stem 16, as described above. When the housing is mounted on the valve stem by means of the auxiliary socket 41 which connects with the cavity 28 thru a passage 32, then the floating piston reciprocates in the radial direction of the wheel actuated by any shocks delivered against the same. Plug 40 closes the unused socket.

In the slightly modified form shown in Figures 4 and 5 all the parts denoted by reference numerals 17 to 27 inclusive are identical with those shown in Figures 2 and 3, described above. The passage 27 connects thru a branch 45 with the passage 46 leading from the chamber 19 to the inlet opening of the valve stem 16 engaging in the socket 18. The branch 46 also connects thru a side branch 47 with another socket 48 adapted to mount the housing on the valve stem 16 for tangential reciprocation of the floating piston 20. A plug 49 is provided to close the socket not used at the time.

A spring actuated check valve 50 is, as before, provided to prevent back flow of air into the filter cavity 23 and a relief valve 51 also spring actuated, is furnished to control the maximum pressure permitted in the tire tube. The resistance of the valve spring 151 is adjusted by the screw plug 52 and an air exhaust vent 53 is furnished back of the valve 51.

The main difference between the construction illustrated in Figures 4 and 5 as compared with that in Figures 2 and 3 resides in the use of a spring actuated piston 54 in Figure 4, instead of a cell or bellows. The shank 55 of this piston engages loosely in the passage 46. The piston is pressed in the direction of the ball 20 in the chamber 19 by its spring 56. A rubber or leather washer 57 is preferably attached to the inner end of the piston in order to deaden the sound of the hammering from the reciprocating ball or floating piston 20 in the chamber 19. This chamber may have an air vent 58 near the plug 21.

In operation, air is sucked in thru the vent 26 past the filter 24 and the valve 50 into the passage 46 and the compression portion 119 of the chamber 19 by the action of the spring 56. When subsequently the floating piston or ball 20, on its return stroke hits the spring piston 54, the air in front of the latter becomes highly compressed and is driven thru the passage 46 into the inlet opening of the valve stem 16 if the pressure in the tire tube is less than the permissible maximum, but if it exceeds that amount the valve 51 opens and permits the air to pass out to the atmosphere thru the vent 53.

In Figures 6 and 7 is shown another embodiment of the invention, the principle, however, being the same. The housing 155, preferably a short cylinder, is bored out to accommodate an inner cylinder 156 engaging snugly at its inner and outer ends in the bore of the housing and having a flange 157 threaded to close the opening at the outer end of the housing. Between the side walls of the housing and the insert cylinder is formed an annular chamber 158 filled with any suitable filter material 159 for cleansing the air passing thru the same. At 60 is shown an intake or vent for atmospheric air and at 61 a passage with a branch 62 leading into the air compression chamber 63 formed in the housing. A check valve 64 is seated in the passage 61 by a spring 65 to prevent back flow of air into the filter chamber 158 from the compression chamber 63. A plug as before is furnished for adjusting the spring pressure against the valve 64, here shown as a ball, but it is evident that any other kind may be used in this, as well as in the above described embodiments of the invention.

Reference numeral 66 represents a diaphragm closing the compression chamber 63 and provided with a stop 67 for limiting the length of oscillation of the diaphragm. The latter is held securely in position by the inner end of the cylinder 156. A socket 68 is formed in the housing to permit its attachment to the threaded end of the valve stem 16 in co-axial direction thereof and a port 69 connects the compression chamber 63 with the inlet opening of the valve stem. A branch 70 connects the port 69 with a second socket 71 set at right angles to the first one for attaching the housing 155 with its axis perpendicular to that of the valve stem. A plug 72 is supplied for closing either one of the sockets not in use.

A relief or pressure control valve is shown at 73 normally closing the outlet passage 75 leading from the pressure chamber 63 to the atmosphere thru the exhaust vent 74. The valve is seated by a spring 76, the load of which is adjusted by a screw plug 77. The actuating mass is here shown in the form of a ball 78 floating in its chamber 79 formed in the cylinder 156. The length of the chamber is considerably greater than the diameter of the ball but its diameter is only slightly larger than that of the ball. A leather washer 80 may be provided in the bottom of the cylinder 156 to deaden the noise caused by the ball.

With the floating piston or ball in the position indicated in Figure 6, air from the atmosphere has been drawn in thru the inlet vent 60, past the filter 159 and the check valve 64 thru passages 61 and 62 into the compression chamber 63. When the ball subsequently moves with accelerated speed inwardly in its chamber, it will hit the diaphragm 66 with a sharp blow, thereby deflecting the same until the stop 67 contacts with the bottom wall of the housing. This deflection will cause the air now compressed in the chamber 63 to be forced thru port 69 past the valve 42 into the inlet of the valve stem 16. Should the pressure in the pneumatic tire then be the maximum permissible, then the air will escape from the chamber 63 thru passage 75 past the valve 73 and thru the exhaust vent 74.

The principle of operation is as follows. Supposing that the housing is mounted as indicated in Figures 1, 2 and 3, with its axis perpendicular to the valve stem 16, or tangentially in the wheel and in the plane thereof; supposing further that the wheel rotates counter clock-wise as indicated by arrow Y in Figure 1; if now a point on the periphery is considered in its movement with regard to a point on a horizontal plane A—C, then the point on the periphery will be at rest at A, move with accelerated speed till it reaches its maximum at B and then with retarded speed till it reaches C, where it will be at rest again. Acceleration will thereupon take place from C to D and retardation from D to A where the point will again be at rest. It should now be observed that the peripheral point, during the completion of its cycle A—B—C—D has traveled in one direction, from A to C, during the upper half of its movement, but in the opposite direction, from C to A, during the lower half of its movement, considering the travel as projected to the horizontal plane. Similarly any point in the housing 17 in Figure 2, when the axis of the chamber 19 is set perpendicular to the wheel radius, will travel with accelerated speed in two opposite directions in a cycle of revolution. With this acceleration reaching its maximum at B, the mass or floating piston 20 will come in violent contact with the end of the expanding cell at this point, thus compressing the air in the cavity 31 and forcing it thru the valve stem 16 into the tube 15. After passing the dead point at C, where the piston 20 will bounce against the washer 22, the speed of the housing is again accelerated until at D a second contact between the piston and the expanding cell takes place. The centrifugal force will in this case have no effect on the movement of the mass or piston because it acts perpendicularly to its line of travel. Gravity, on the other hand, will assist the action of the floating piston at C but counteract it at A.

The conditions are somewhat different when the housing 17 is mounted as indicated in Figure 4 of the drawings, that is to say, coaxial with the valve stem or radially in the wheel. The movement will then have to be considered with regard to a vertical plane so that the dead points will be located at B and D and the points of greatest acceleration at A and C. In this case the centrifugal force is active at all four points, but the force of gravity only at B and D. The two forces cooperate at D but counteract each other at B. Consequently the floating piston 20 will press hard against the piston 54 when at D, but at B, the two forces might balance each other, at high speed the mass or ball would be driven against the piston 54 and at low speed to the opposite end of the cylinder against the washer 22.

Whether the housing is mounted radially or tangentially in the wheel, the action will be the same when the wheel meets with an obstruction in the road and is bumped. If the blow is delivered when the axis of the ball chamber 19 stands perpendicular to the road surface, the mass or ball will be sent violently from one end to the other in its chamber and deliver blows in both directions. Should, however, the chamber axis be parallel to the road surface, the mass or ball would remain practically unaffected.

The modification shown in Figures 5 and 6 also operates according to the same principle.

On machine parts having rectilinear or oscillating movement the housing of this device has naturally to be mounted with the axis of the chamber for the moving mass or ball in the direction of reciprocation in order to give the mass the needed movement.

It is evident that many changes in the details and construction of the device may be made under the scope of the claims.

In Figure 8, reference numeral 84 represents a pitman or connecting rod on which the housing 17 is secured, the device then operating as a lubricating apparatus receiving its lubricant or oil supply thru the flexible hose or pipe 81 and delivering it thru the conduit 82 to the journal 83.

I claim:

1. A fluid compressing and injecting device, comprising a housing mounted to reciprocate and provided with a main chamber coaxial with the line of reciprocation and a compression chamber of variable capacity associated with the main chamber, a closing element between said chambers, a freely movable mass in the main chamber adapted to reduce the volume of the compression chamber upon impact against said element from its inertia caused by said reciprocation, and a delivery port and a one-way intake port for the compression chamber in the housing.

2. A fluid compressing and injecting device, comprising a housing mounted to reciprocate and provided with a main chamber coaxial with the line of reciprocation and a compression chamber of variable capacity associated with the main chamber, a flexible element between said chambers, a floating ball in the main chamber adapted to actuate said element upon impact caused by its inertia during said reciprocation, a delivery port and a one-way intake port for the compression chamber, and means adapted to check back flow in the compression chamber.

3. The combination with a revolving body, of a fluid compressing and injecting device, comprising a housing having a main chamber with its axis substantially tangential to its orbit in the plane of rotation and a compression chamber of variable capacity associated with the main chamber, a freely moving mass in the main chamber adapted to reduce the volume of the compression chamber upon impact caused by its inertia during the rotation of the said body, a delivery port and a one-way intake port being provided for the compression chamber in the housing.

4. The combination with a revolving body, of a fluid compressing and injecting device, comprising a housing having a main chamber with its axis substantially tangential to its orbit in the plane of rotation and a compression chamber associated with the main chamber, flexible bellows at the mouth of the compression chamber, a freely moving mass in the main chamber adapted to compress the bellows upon impact caused by inertia of said mass during rotation of the body, a delivery port and a one-way intake port being provided for the compression chamber in the housing.

5. The combination with a revolving body, of a fluid compressing and injecting device, comprising a housing having a main chamber with its axis substantially tangential to its orbit in the plane of rotation and a compression chamber, a compressing means for the compression chamber, a freely moving mass in the main chamber adapted to actuate said means upon impact caused by the inertia of said mass during rotation of said body, a delivery port and a one way intake port being provided for the compression chamber in the housing.

In testimony whereof I affix my signature.

LOUIS H. CROOK.